Aug. 4, 1970     E. ZETTERBERG     3,522,690
MACHINE FOR TIGHTENING THREADED CLOSURES ON CONTAINERS
Filed March 24, 1967     4 Sheets-Sheet 2

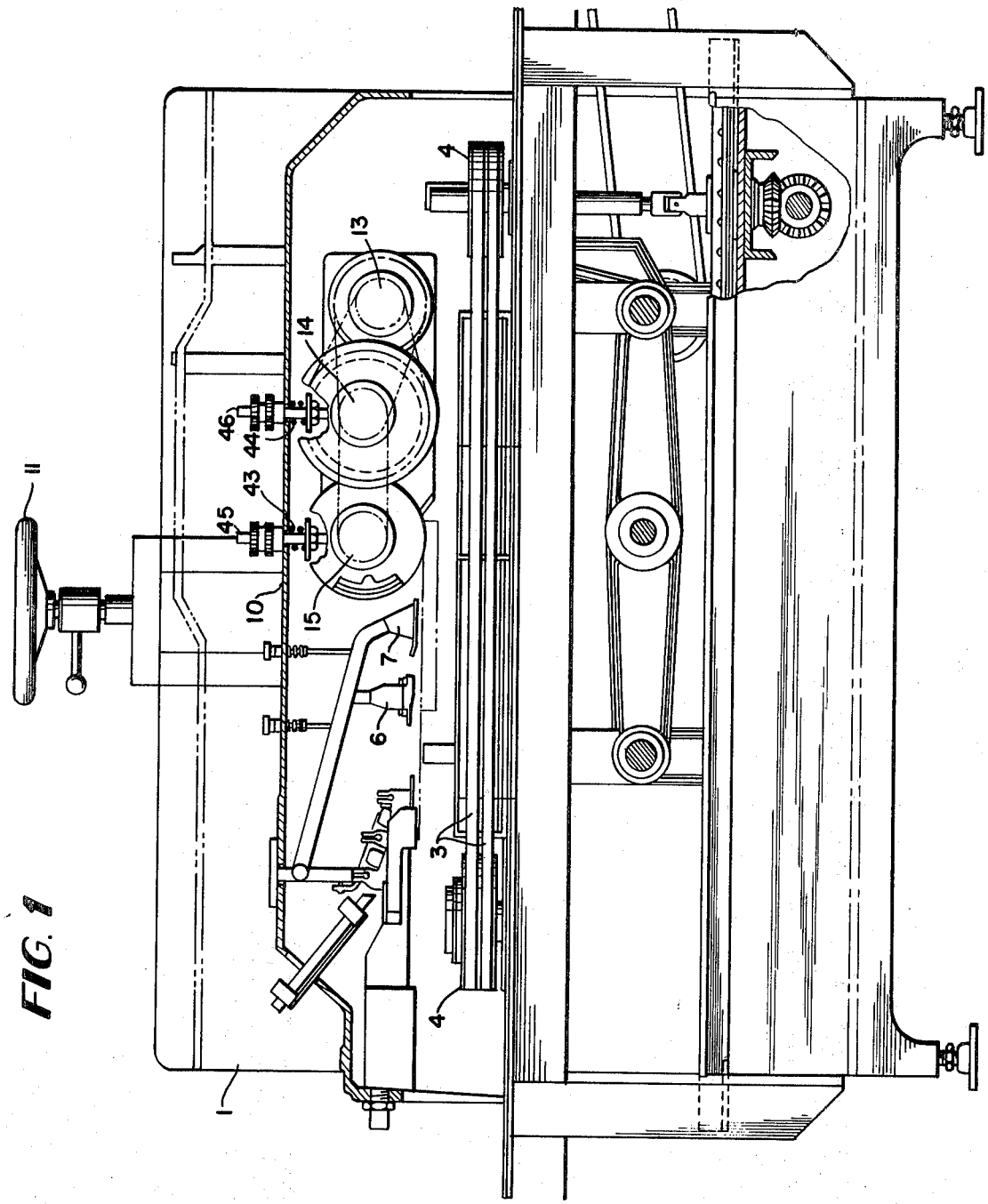

INVENTOR.
EINAR ZETTERBERG
BY
ATTORNEYS

INVENTOR.
EINAR ZETTERBERG

Aug. 4, 1970      E. ZETTERBERG      3,522,690
MACHINE FOR TIGHTENING THREADED CLOSURES ON CONTAINERS
Filed March 24, 1967      4 Sheets-Sheet 4
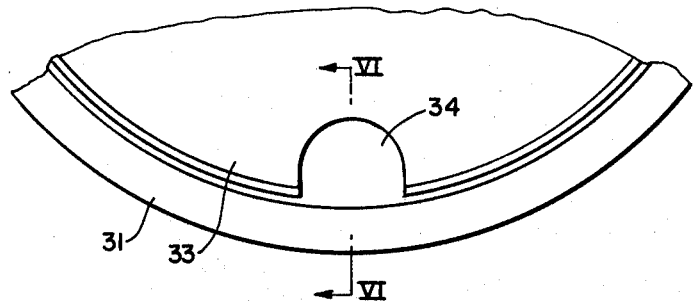
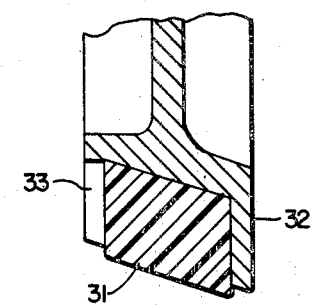
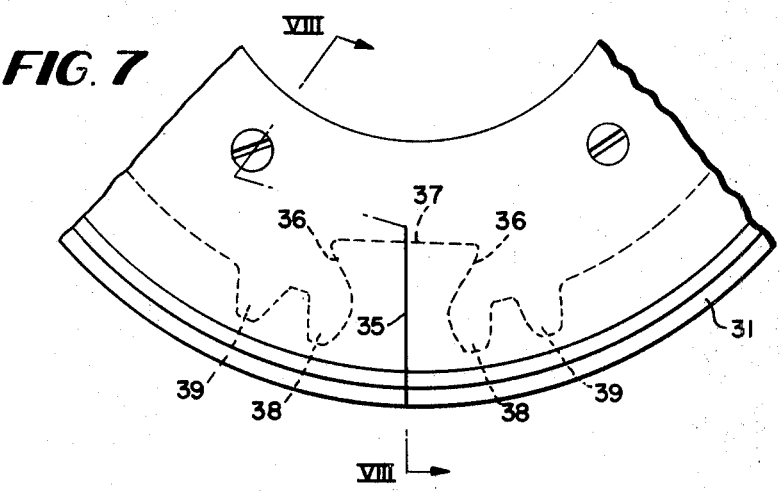
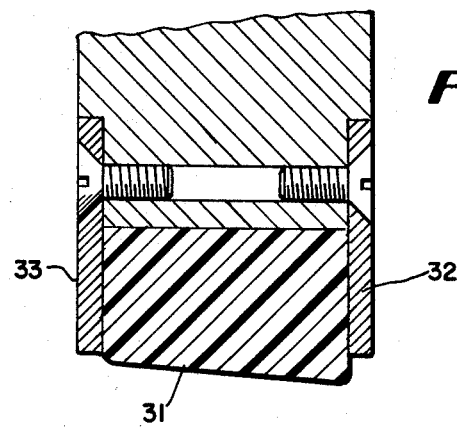
INVENTOR.
EINAR ZETTERBERG
BY
ATTORNEYS

United States Patent Office 3,522,690
Patented Aug. 4, 1970

3,522,690
MACHINE FOR TIGHTENING THREADED CLOSURES ON CONTAINERS
Einar Zetterberg, Malmo, Sweden, assignor to Aktiebolaget Skane-Emballage, Staffanstorp, Sweden, a corporation of Sweden
Filed Mar. 24, 1967, Ser. No. 625,780
Claims priority, application Sweden, Apr. 7, 1966, 4,801/66
Int. Cl. B65b 7/28; B67b 3/20
U.S. Cl. 53—331.5   5 Claims

ABSTRACT OF THE DISCLOSURE

A machine with a conveyor to transport containers past a device for tightening threaded closures on the containers. The tightening device has one or more pairs of wheels with axes at right angles to the direction of movement of the containers through the machine, at right angles to the vertical axis of said containers, and above the conveyor. The two wheels are driven with different periphery velocities, adjusted relative to the speed of movement of the containers so their co-operation with a threaded closure imparts a rotating movement to the threaded closures.

BACKGROUND OF THE INVENTION

The present invention relates to a machine for placing threaded closures on containers comprising a conveyor for transporting the containers through the machine and a tightening means for tightening the threaded closures which have been placed on said containers. Machines of this kind are previously known in many different embodiments. Generally the tightening means cooperate with the threaded closures from the sides thereof and either keep the threaded closures in a non-rotating condition while the containers are brought to rotate in order to achieve the tightening or bring about a rotation of each threaded closure while the containers are kept in a non-rotating condition by special means.

Tightening means of this kind have the draw-back that they are suited only to a certain diameter of the closure and that, therefore, they have to be adjustable so that they may be adjusted to different diameters of the closures. If the tightening means are arranged to bring about a rotation of each threaded closure, it is obvious, that the mantel surface with which the tightening means cooperate must be substantially cylindrical, and this is a further limitation of the usefulness of the known tightening means. In case the tightening means serve for keeping the threaded closures in a non-rotating condition while the containers are brought to rotate, it is obvious that the containers must be provided with a cylindrical mantel surface by means of which the means which bring the containers to rotate are adapted to cooperate.

It has also been suggested to construct a tightening means which cooperate with the threaded closure through exerting a pressure to the closure at the upper side thereof so that the closure will be kept still while the container is brought to rotate with the aid of belts which cooperate with the side surface of the container, while the container is transported through a machine. Also in the last named case the container must be provided with a cylindrical mantel surface in order that tightening of the closure should be brought about.

A still further tightening means is known in which two flat belts are provided, said belts being arranged to run with mutually different speed and being adapted to cooperate with the closures by engaging the upper side thereof. By this means a rotation of the closure will be obtained, while the containers are prevented to rotate by means of side belts. This device has the drawback that the belts are rapidly worn out. Further it has been difficult to get a full control over the tightening power exerted to the closure, because the belts sometimes cooperate only with a closure which is being tightened and at other instants cooperate also with one or more closures that are already tightened. In the latter case the belts are braked and the tightening effect reduced.

SUMMARY OF THE INVENTION

The present invention relates to a machine in which the limitation with respect to the shape of the threaded closure or to the containers which has been indicated above, is eliminated. The machine according to the invention is further more simple, less expensive and more reliable than machines hitherto known. With the new machine the tightening effect is independent of whether the containers are transported through the machine with great distances between the containers or close to each other.

The invention is characterized by the fact that the tightening means comprises one or more pairs of circular wheels mounted on shafts, said shafts being located at a right angle to the transport direction of the containers through the machine and also at a right angle to the axial direction of the containers, the two wheels of each pair being disposed above the conveyor for the containers and being driven with different periphery speeds, said speeds being so adjusted with respect to the transport speed of said containers, that when the containers pass beneath one pair of wheels and the periphery of each wheel is brought in engagement with the threaded closure, the closure is brought to rotate on the container.

BRIEF DESCRIPTION OF DRAWINGS

In the following the invention will be described more in detail, reference being had to the accompanying drawings, in which
FIG. 1 is a longitudinal section of a machine for locating threaded closures on containers, said machine being provided with a tightening means according to this invention,
FIG. 5 is a part of the periphery of a wheel which is comprised in the tightening means according to the invention,
FIG. 6 is a cross section of the wheel according to FIG. 5 along the line VI—VI, as viewed in the direction of the arrows,
FIG. 7 illustrates a part of the periphery of a tightening wheel according to another embodiment of the invention,
and
FIG. 8 is a cross section of wheel according to FIG. 7 along the line VIII—VIII, as viewed in the direction of the arrows.

Figure 2:
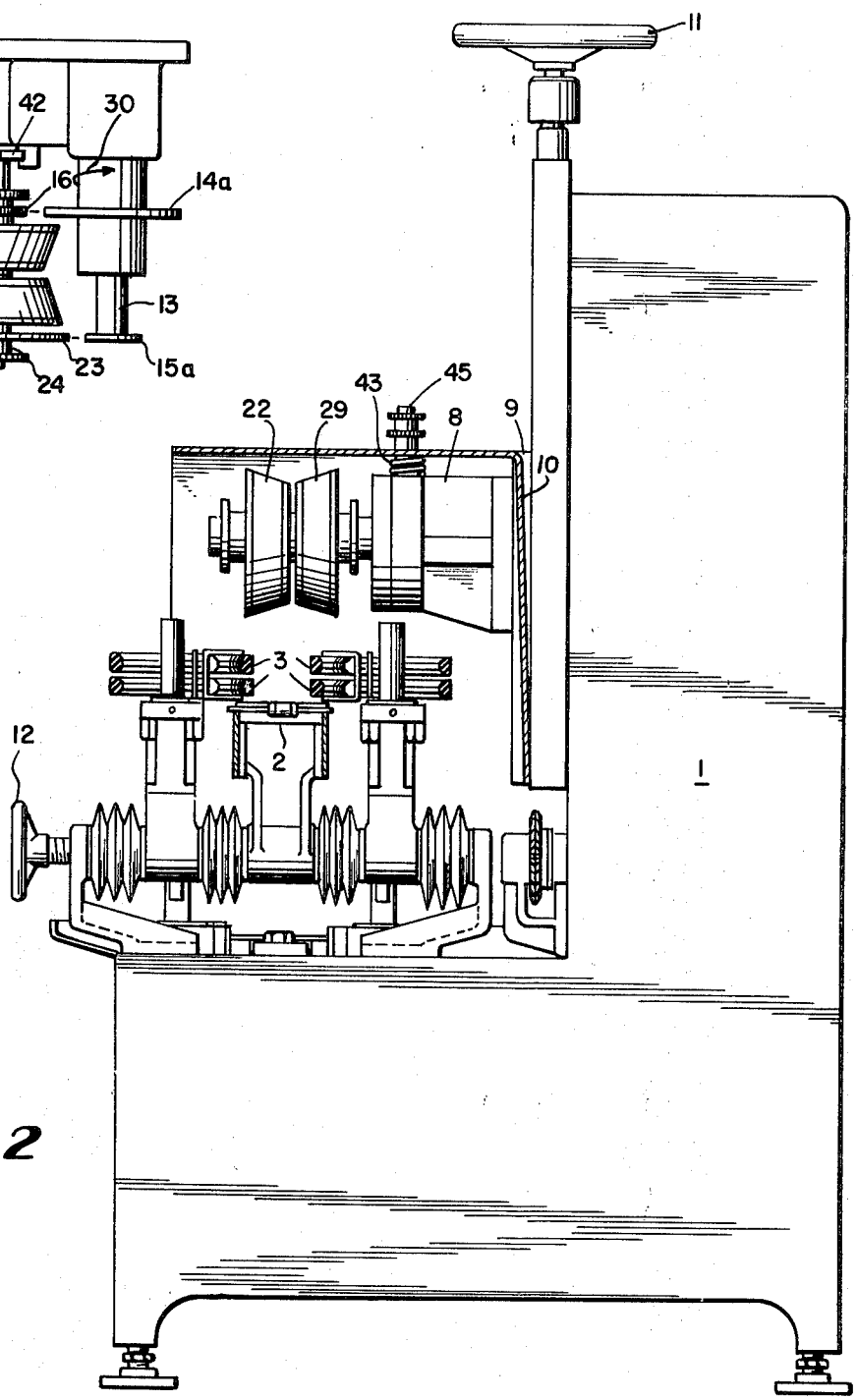
FIG. 2 is a cross section through said machine.

The machine according to the invention comprises a frame 1 in which there is a bottom conveyor, comprising a number of belts 2, said belts running over pulleys, not shown, and being driven of said pulleys. This conveyor is visible only in FIG. 2 and in FIG. 4. Further there are a number of side belts 3 in the form of V-belts, which are running over pulleys 4 and which are adapted to be driven at the same speed as the bottom conveyor. The containers 5 (FIG. 4) are located on the bottom conveyor and are being clamped under spring action between the side conveyors, during the transport of the containers through the machine. Further, the machine comprises a feeding device (not shown) for the threaded closures, for example lids of the twist type, as well as means for locating and correcting the location of said closures on the containers. These devices comprise correcting shoes and pressing down shoes, said shoes being designated 6 and 7.

When the threaded closures have been located correctly on the openings of the containers, said containers are brought to pass beneath the tightening means. Said tightening means comprises a bracket 8 (FIG. 2) which is fastened to a panel 9, said panel being also adapted to carry the means for locating the threaded closures and the shoes 6 and 7 for pressing down said closures. This panel 9 and a cover 10 belonging thereto is adapted to be raised and lowered by means of a control wheel 11, in order to adjust the machine to containers of substantially different heights.

Similarly, the side belts 3 are adjustable in a lateral direction with respect to each other by means of a control wheel 12 (FIG. 2) in order to adjust the machine for containers of substantially different width or different diameters.

Figure 3:
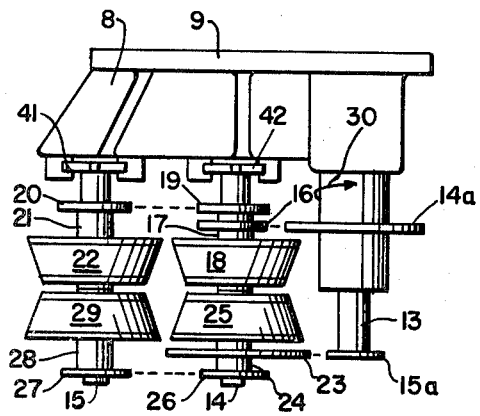
FIG. 3 is a view of the tightening means according to the invention as viewed from the top.

The bracket 8, as seen in FIG. 3, carries three shafts 13, 14, 15 of which the shaft 13 is driven from a driving source, not shown. The shaft 13 is provided with a large chain wheel 14a and a smaller chain wheel 15a. The chain wheel 14a is by means of a chain in driving connection with a smaller chain wheel 16, said chain wheel 16 being mounted on a hollow axle which is rotatably mounted on a stationary pin 14. Said hollow axle is further provided with a conical wheel 18, said wheel having a friction cover. The hollow axle 17 is further provided with another chain wheel 19, which by means of a chain is in driving connection with a chain wheel 20 carried by a hollow shaft 21, said hollow shaft being rotatably pivoted on a stationary pin 15. The hollow axle 21 is also provided wtih another conical wheel 22 which has a friction cover.

The chain wheel 15a on the shaft 13 is by means of chains in driving connection with a chain wheel 23 which is mounted on a hollow axle 24 rotatably pivoted on the stationary pin 14. The hollow shaft 24 also carries a conical wheel 15 which is provided with a friction cover and further said hollow shaft 24 is provided with a chain wheel 26 which by means of a chain is in driving connection with a chain wheel 27, said chain wheel being mounted on a hollow axle 28 which is rotatably pivoted on a stationary pin 15. The hollow axle 28 is provided with a conical wheel 29 which has a friction cover.

If the shaft 13 is brought to rotate, the direction of rotation being that shown by the arrow on the ring 30 (FIG. 3), i.e. in a clockwise direction according to FIG. 1, the conical wheel 18 will rotate with a greater velocity than the conical wheel 25 and correspondingly the conical wheel 22 will rotate with a greater velocity than the conical wheel 29. It is assumed, that the containers are transported beneath the tightening means with a speed of transportation which is about the mean value of the periphery velocities of the wheels 18 and 25.

Figure 4:
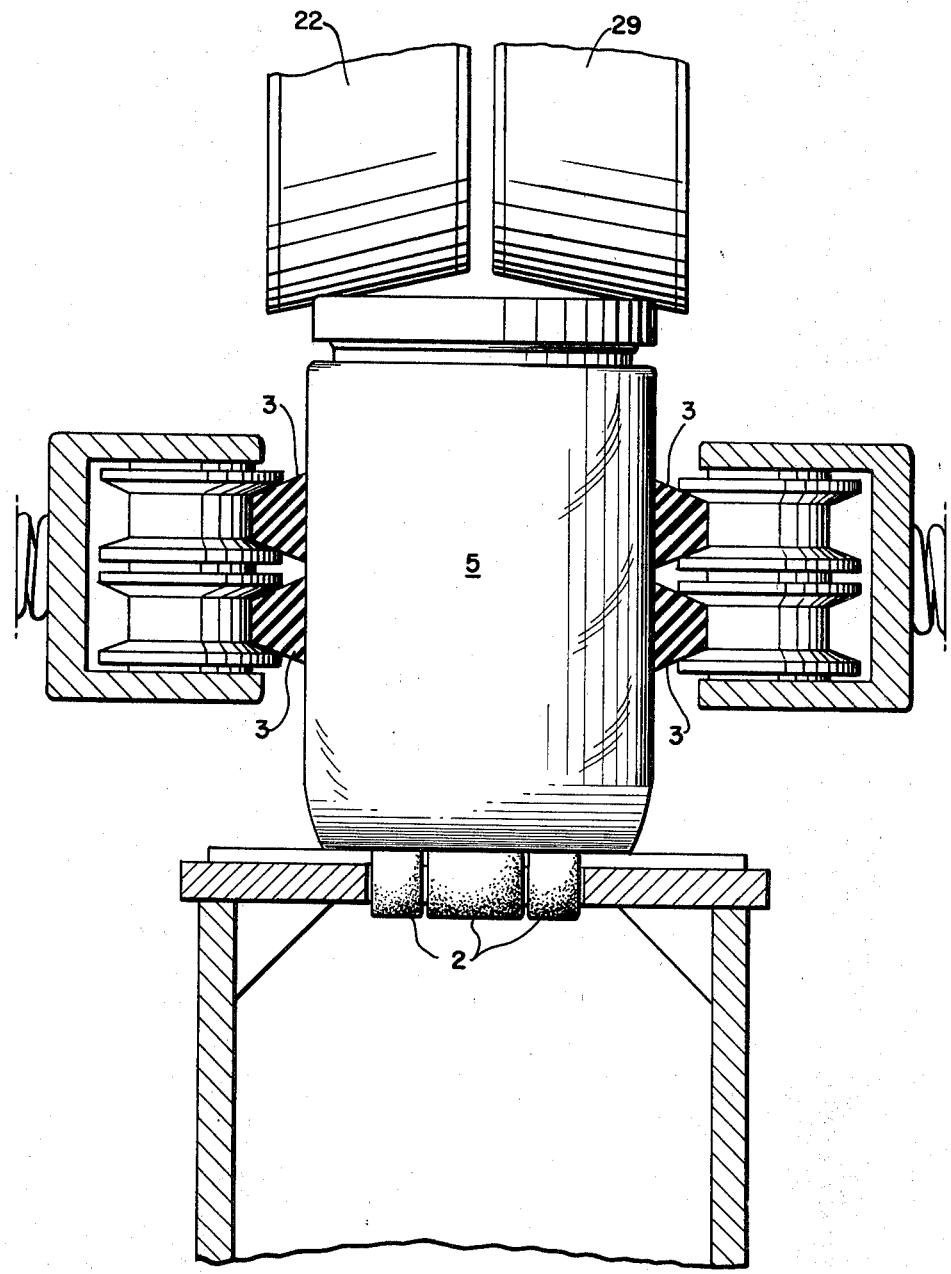
FIG. 4 illustrates on a greater scale a cross section of a part of the machine according to FIG. 1.

As will be apparent from FIG. 4, the conical periphery surfaces of the wheels which are provided with friction covers will be bought to cooperate with the upper sides of the threaded closures which are located on the containers 5. Said threaded closures will thereby be caused to rotate during the time when the containers are transported beneath the tightening means. The containers are prevented from taking part in said rotation because of the clamping effect which is exerted to said containers by the side belts 3. A first tightening of the closures will take place by the action of the wheels 22 and 29 and a last, hard tightening will be effected by the wheel pair 18, 25.

The friction covers of said wheels should be of suitable hardness and may, for example, consist of rubber neoprene, or of some other elastical or otherwise suitably resilient material. In the material, of which the friction cover is made, some friction improving substance may be incorporated, for example stone powder, metal powder or the like. The friction cover should be easily exchangeable. In FIGS. 5 and 6 is illustrated, how the friction cover 31 may comprise an annular member which is located in a groove in each of the wheels. The groove is defined by flanges 32, 33. In order to facilitate the exchange of the friction cover, one of said flanges 32 or 33 may be removable, but if the friction cover is sufficiently elastic, this may be unnecessary. In that case, the friction cover may for example be forced over the smaller flange 33. In order to facilitate the removal of a worn out friction cover, the flange 33 may for example be provided with a semi-circular recess 34 (FIG. 5) in which a suitable tool may be inserted for effecting the removal of the friction cover. In order to positively prevent the friction covers 31 to be rotated on the wheels 18, 22, 25, 29, said wheels may be provided with some unevenesses in the form of ridges or recesses, for example teeth, in the bottom or at the side of the groove in which the friction cover is located. The friction cover should in this case be provided with corresponding recesses or ridges which are fitted in the unevenesses of the groove.

In FIGS. 7 and 8, there is illustrated how the friction cover may consist of an annular member with ends abutted at 35. Each end of the open friction belt is provided with a bead 36. When said beads are abutting against each other, as illustrated, they form together a dovetail shaped member, which is inserted in a correspondingly shaped recess 37 in the bottom of the groove in each wheel 18, 22, 25, 29, in which the friction cover is located. In order to further keep the friction cover fixed against rotating and to prevent that the friction cover will open at the joint 35, ridges 38, 39 are provided in the bottom of the groove at each side of the recess 36. Of course, there are grooves which correspond to the ridges 37, 38, provided in the friction cover adjacent to each bead 36.

In FIGS. 7 and 8 there is also illustrated how the flanges 32, 33 of the wheel may be easily removable from the wheel as previously stated.

In order to achieve a sufficient pretightening of the closures, when the containers are passing the first pair of wheels 22, 29, it is possible to provide a further transmission gear so that the wheels 22, 29 may rotate with a greater difference of velocity than the pair of wheels 18, 25. By this means a tightening is achieved which is represented by a greater angle of rotation under the pair of wheels 22, 29 and a tightening which is represented by a smaller angle of rotation but greater force under the pair of wheels 18, 25.

Each pair of wheels 22, 29 and 18, 25 is carried by its stationary pin 15, 14. Each such pin is mounted on a displaceable guide 41, 42, each such guide being slidable in a groove which is provided in the bracket 8. Each pair of wheels is pressed down by a screw spring 43, 44. The height to which each pair of wheels may be displaced under spring action is adjustable by means of adjusting screws 45, 46.

Because the containers are clamped against rotation during the transport through the machine, the device can, for example, be used for containers of square cross section, for elliptical containers or the like, and also for round containers. Because the closures are rotated by the wheels which cooperate with the upper sides of the closures, it is also possible to use closures which are not round, but which, for example, may be octagonal.

I claim:

1. A machine for locating and tightening threaded closures on containers comprising a conveyor for transport of said containers through the machine and a tightening device for tightening threaded closures located on said containers, said tightening device comprising at least one pair of circular wheels; a shaft provided for and mounting each pair of said wheels with their axis located at right angle to the direction of movement of said containers through the machine, at right angle to the vertical axis of said containers, and said two wheels in a pair being located above the conveyor for said containers and being driven with different periphery velocity, the periphery velocities being so adjusted relative to the speed of movement of said containers through the machine, that, when said containers pass under a pair of said wheels and the periphery of each wheel co-operates with a threaded closure, a rotating movement in a direction to tighten said closure is imparted to said threaded closures by said wheels; said circular wheels each having a friction cover adapted to co-operate with the threaded closures, said friction cover of each wheel consists of an annular member which can be applied on and removed from said wheel, said cover having two ends in substantial abutment to provide the annular shape and said two ends provided with fastening beads adapted to be received in a corresponding recess in the wheel on which said friction cover is applied.

2. A machine for locating and tightening threaded closures on containers comprising a conveyor for transport of said containers through the machine and a tightening device for tightening threaded closures located on said containers, said tightening device comprising: at least one pair of coaxial circular wheels; means mounting each pair of said wheels with its axis located at right angle to the direction of movement of said containers through the machine, at right angle to the vertical axis of said containers, and said two wheels in a pair being located above the conveyor for said containers; means driving said two wheels in a pair with different periphery velocities, said periphery velocities being so adjusted relative to the speed of movement of said containers through the machine, that, when said containers pass under a pair of wheels and the periphery of each wheel co-operates with opposite portions of the top of a threaded closure, a rotating movement is imparted to said threaded closures by said wheels; a friction cover for each said wheel, each said cover being adapted to engage with the threaded closures and consisting of an annular member; and each said annular member and each said wheel including co-operating means enabling said annular member to be removably maintained on its associated wheel comprising a removable rim means on the wheel confining the annular member on the periphery of the wheel.

3. A machine for locating and tightening threaded closures on containers comprising a conveyor for transport of said containers through the machine and a tightening device for tightening threaded closures located on said containers, said tightening devices comprising: at least one pair of coaxial circular wheels; means mounting each pair of said wheels with its axis located at right angle to the direction of movement of said containers through the machine, at right angle to the vertical axis of said containers, and said two wheels in a pair being located above the conveyor for said containers; means driving said two wheels in a pair with different periphery velocities, said periphery velocities being so adjusted relative to the speed of movement of said containers through the machine, that, when said containers pass under a pair of wheels and the periphery of each wheel co-operates with opposite portions of the top of a threaded closure, a rotating movement is imparted to said threaded closures by said wheels; a friction cover for each said wheel, each said cover being adapted to engage with the threaded closures and consisting of an annular member; and each said annular member and each said wheel including co-operating means enabling said annular member to be removably maintained on its associated wheel comprising lug means on said annular member and recess means on said wheel periphery co-operating to maintain said member and said wheel as a rotatable unit.

4. A machine for locating and tightening threaded closures on containers comprising a conveyor for transport of said containers through the machine and a tightening device for tightening threaded closures located on said containers, said tightening device comprising: more than one pair of coaxial circular wheels, means mounting each pair of said wheels with its axis located at right angle to the direction of movement of said containers through the machine, at right angle to the vertical axis of said containers, said two wheels in a pair being located above the conveyor for said containers and said pairs of wheels being mounted in tandem disposition; means driving said two wheels in a pair with different periphery velocities, said periphery velocities being so adjusted relative to the speed of movement of said containers through the machine, that, when said containers pass under a pair of wheels and the periphery of each wheel co-operates with opposite portions of the top of a threaded closure, a rotating movement is imparted to said threaded closures by said wheels, a friction cover for each said wheel, each said cover being adapted to engage with the threaded closures and consisting of an annular member; and each said annular member and each said wheel including co-operating means enabling said annular member to be removably maintained on its associated wheel; whereby said wheel pairs in tandem disposition are successively engaged by the threaded closure of a container being conveyed beneath said pairs of wheels and each pair applies a tightening rotation to said threaded closure.

5. A machine for locating and tightening threaded closures on containers comprising a conveyor for transport of said containers through the machine and a tightening device for tightening threaded closures located on said containers, said tightening device comprising: at least one pair of coaxial circular wheels; means mounting each pair of said wheels with its axis located at right angle to the direction of movement of said containers through the machine, at right angle to the vertical axis of said containers, and said two wheels in a pair being located above the conveyor for said containers; means driving said two wheels in a pair with different periphery velocities, said periphery velocities being so adjusted relative to the speed of movement of said containers through the machine, that, when said containers pass under a pair of wheels and the periphery of each wheel co-operates with opposite portions of the top of a threaded closure, a rotating movement is imparted to said threaded closures by said wheels; a friction cover for each said wheel (each said cover being adapted to engage with the threaded closures and consisting of an annular member; and each said annular member and each said wheel including co-operating means enabling said annular member to be removably maintained on its associated wheel; said friction cover portion of each wheel in a pair of wheels having a frusto-conical peripheral surface, with said surface tapering inward in a direction toward the other wheel of the same pair of wheels.

References Cited
UNITED STATES PATENTS

| | | | |
|---|---|---|---|
| 2,909,879 | 10/1959 | Hohl et al. | 53—331.5 |
| 3,143,835 | 8/1964 | McElroy et al. | 53—331.5 X |

TRAVIS S. McGEHEE, Primary Examiner